US012801807B2

(12) United States Patent
Gurevich et al.

(10) Patent No.: US 12,801,807 B2
(45) Date of Patent: Nov. 17, 2026

(54) METHOD FOR PREDICTING POROSITY DISTRIBUTION IN CAST METAL OBJECTS

(71) Applicant: Magma Giessereitechnologie GmbH, Aachen (DE)

(72) Inventors: Vitalii Gurevich, Aachen (DE); Wilfried Schaefer, Nideggen-Schmidt (DE)

(73) Assignee: Magma Giessereitechnologie GmbH, Aachen (DE)

( * ) Notice: Subject to any disclaimer, the term of this patent is extended or adjusted under 35 U.S.C. 154(b) by 1236 days.

(21) Appl. No.: 17/492,759

(22) Filed: Oct. 4, 2021

(65) Prior Publication Data

US 2022/0114305 A1 Apr. 14, 2022

(30) Foreign Application Priority Data

Oct. 9, 2020 (EP) .................................... 20201032

(51) Int. Cl.
*G06F 30/20* (2020.01)
*G06F 30/10* (2020.01)
*G06F 111/10* (2020.01)
*G06F 113/08* (2020.01)

(52) U.S. Cl.
CPC .............. *G06F 30/20* (2020.01); *G06F 30/10* (2020.01); *G06F 2111/10* (2020.01); *G06F 2113/08* (2020.01)

(58) Field of Classification Search
CPC ....... G06F 30/10; G06F 30/20; G06F 2111/10
USPC .............................................................. 703/1
See application file for complete search history.

(56) References Cited

U.S. PATENT DOCUMENTS

| | | | | |
|---|---|---|---|---|
| 5,677,844 A * | 10/1997 | Kubo | B22D 46/00 | 700/146 |
| 2012/0232685 A1* | 9/2012 | Wang | B22D 46/00 | 700/98 |
| 2012/0232858 A1 | 9/2012 | Zhou et al. | | |

FOREIGN PATENT DOCUMENTS

| | | | |
|---|---|---|---|
| CN | 102117358 | A | 7/2011 |
| CN | 103257214 | B | 8/2013 |
| CN | 109063322 | A | 12/2018 |
| CN | 110705158 | A | 1/2020 |
| JP | H06122068 | A | 1/1998 |
| JP | 2001105098 | A | 4/2001 |
| JP | 2004066282 | A | 3/2004 |

(Continued)

OTHER PUBLICATIONS

Dunming et al, Research status and prospects of numerical simulation technology of casting macro-process, Journal of Metallurgy, Issued Feb. 11, 2018, 13 Pages.

(Continued)

*Primary Examiner* — Andre Pierre Louis
(74) *Attorney, Agent, or Firm* — Nordic Patent Service

(57) ABSTRACT

A system and method for predicting porosity defects due to solidification in a process of casting a metal object by calculating a fraction liquid distribution field for a solution domain defined based on a 3D computer model of the metal object and defining a second order, graph-like sub-grid of interconnected feeding units separated by interface areas by finding minima in the fraction liquid distribution field. A change in porosity volume is determined in each of the (Continued)

feeding units by calculating the total volume of metal inflow and outflow between a feeding unit and its adjacent feeding units and calculating metal shrinkage in the feeding units.

16 Claims, 9 Drawing Sheets

(56) References Cited

FOREIGN PATENT DOCUMENTS

| | | | |
|---|---|---|---|
| JP | 2005144542 | A | 6/2005 |
| JP | 2006159221 | A | 6/2006 |
| JP | 2007222886 | A | 9/2007 |
| JP | 2008155248 | A | 7/2008 |
| JP | 2015174116 | A | 10/2015 |
| JP | 2018149576 | A | 9/2018 |
| JP | 2019072749 | A | 5/2019 |
| JP | 2019171418 | A | 10/2019 |

OTHER PUBLICATIONS

Lu Xiaoren et al., Research progress on the formation mechanism and suppression methods of pores and crack defects in laser cladding layers, Functional Materials, Issue 06, Issued Jun. 30, 2020.

The State Intellectual Property Office of People's Republic of China, First Office Action, Application No. 202111175549.0, Issue Date Apr. 3, 2024, 7 Pages.

Japanese Patent Office, Decision to Grant a Patent, Japanese Patent Application No. 2021-158551, Drafting date Jan. 13, 2023, Mail date Jan. 17, 2023, 3 Pages.

European Patent Office, Extended European Search Report, Application No. 20201032.8, Mailed Feb. 18, 2021, 8 pages.

Khalajzadeh et al, "Simulation of Shrinkage Porosity Formation During Alloy Solidification", Metallurgical and Materials Transactions A, vol. 51, No. 5, pp. 2239-5623, XP037084819, ISSN: 1007/S11661-020-05699-Z, Mar. 10, 2020, 8 pages.

Reis et al, "Modeling of shrinkage defects during solidification of long and short freezing materials", Journal of Materials Processing Technology, vol. 202, No. 1-3, XP022639920, ISSN: 0924-0136, Doi: 10.1016/J.JMATPROTEC.2007.10.030, Jun. 20, 2008, 7 pages.

Zhou et al, "Feed paths and hot spots computation bases on a time gradient method in casting", The International Journal of Advanced Manufacturing Technology, vol. 93, No. 1, pp. 261-272, XP036339750, ISSN: 0268-3768, DOI: 10.1007/S00170-016-8932-6, May 24, 2016, 12 pages.

* cited by examiner

METHOD FOR PREDICTING POROSITY DISTRIBUTION IN CAST METAL OBJECTS

TECHNICAL FIELD

The disclosure relates to processes that involve casting a metal object in a cavity in a mold. In particular the disclosure relates to improving such metal casting processes by predicting porosity defects due to shrinkage in the object to be cast through simulation and by providing means to change process conditions to improve cast object quality.

BACKGROUND

Casting is a manufacturing process by which a liquid material is poured into a mold, which contains a hollow cavity of the desired shape. Dependent on local heat exchange with its environment (e.g. mold, air) the liquid material is cooling down and solidifying in accordance with material specific phase transformation physics. The solidified part is also known as a casting, which is ejected or broken out of the mold to complete the process. Casting is most often used for producing complex shapes that would otherwise be difficult or uneconomical to be produced by other methods. If the casting material is a metal, this metal material is heated-up to a pouring temperature that is higher than the so called liquidus temperature and poured into the mold, which may also include runners and risers that enable a controlled filling and solidification of the casting. The metal is then cooling in the mold, the metal solidifies, and the solidified part (the casting) is removed from the mold at a process and material specific metal temperature or process time. Subsequent operations remove excess material required by the casting process (such as the runners and risers).

In metal casting, defects and other undesired outcomes are conventionally referred to as irregularities. Some irregularities occurring in a metal casting can be tolerated, while others need to be prevented or at least minimized. One such irregularity is porosity due to metal shrinkage in the casting, which can be identified as either macro- or microporosity, based on the local porosity volume. Porosity develops when the metal shrinks during the phase transformation and this shrinkage cannot be compensated by feeding the shrinking region with still liquid metal from other regions of the casting.

A simulation of the metal casting process may use multiple techniques including numerical methods to calculate cast component quality considering mold filling, solidification and further cooling, and may provide a quantitative prediction of casting mechanical properties at each point in time during an entire casting process and additional processing steps such as heat treatment. Thus, such simulations can describe the quality of a cast component up-front before production starts. The casting rigging can then be designed with respect to the required component quality and properties. This has benefits beyond a reduction in pre-production sampling, as the precise layout of the complete casting system also leads to energy, material, and tooling savings. The simulation may support a product designer in component design or the foundry in determining melting practice and casting method, including pattern and mold making, heat treatment, and finishing. This may save costs, resources and time along the entire casting manufacturing route.

Some commercially available simulation software solutions provide means for predicting irregularities such as porosity formation during the metal casting process. However, these known simulation software solutions have not yet been able to effectively calculate and accurately predict the volume and position of porosity defects in cast metal objects with complex geometries with the required accuracy.

Calculating on a macroscopic scale enables rather short calculation times but provides less detailed information about individual predicted defects. In particular, effects such as microscopic liquid flow, especially for the flow through the complex growing solidification microstructure at local positions are not considered in detail during solidification but may have a significant impact on the results. During solidification, i.e. the phase transformation from liquid to solid, the solid phase is growing within the melt, typically starting at several positions where the physical conditions are fulfilled. During local solidification the growing solid body has a certain permeability for melt flow depending on the local conditions and the degree of solidified fraction. Beside melt flow on the macroscopic scale e.g. due to convection, this "microscopic" melt flow may significantly affect the volumes and positions of porosity defects. Exactly calculating these types of effects would, beside the availability of both appropriate physical models which consider the relevant effects as well as proven data needed for modeling, require an extremely high-resolution discretization of the cast metal. Such high resolution calculations typically require enormous computer capacities and calculation time, and thus are not usable in production companies which in practice widely use process simulation in order to design robust processes and maintain specified casting quality.

SUMMARY

It is an object to provide an improved method and system for determining porosity due to shrinkage in a cast metal object that overcomes or at least reduces the problems mentioned above.

The foregoing and other objects are achieved by the features of the independent claims. Further implementation forms are apparent from the dependent claims, the description and the figures.

According to a first aspect, there is provided a computer-implemented method for improving a process of casting a metal object in a cavity in a mold by determining a change in quantity and position of porosity due to solidification, the method comprising:

- providing a 3D computer model defining the geometry of at least the metal object to be cast;
- discretizing a solution domain based on the 3D computer model to form a 3D mesh with a plurality of 3D cells;
- specifying boundary conditions, the boundary conditions comprising relevant material properties (such as thermophysical properties) of materials involved in the casting;
- simulating at least one time step of the solidification process of the metal object during casting based on the process specific boundary conditions, the simulation comprising, for the at least one time step of the solidification process:
- solving transient equations representing transient physics of the solidification process for the solution domain;
- calculating the fraction liquid distribution ($F_l$) for the solution domain, wherein fraction liquid ($f_l$) is defined as the fraction of liquid metal in the 3D cells;
- determining at least one feeding unit (FU) within the solution domain based on the fraction liquid distribution ($F_l$), wherein a feeding unit is defined as a group of interconnected 3D cells with a fraction liquid value higher than zero $f_l>0$ and a fraction liquid gradient value not equal to zero $\nabla f_l<>0$, and wherein adjacent feeding units are separated by an interface area, wherein an interface area is defined as a group of interconnected 3D cells with a fraction liquid gradient equal to zero $\nabla f_l=0$; and calculating a change in quantity and position of porosity in each of the at least one feeding units.

The division of the solution domain into feeding units can be used to increase the performance of the calculation of changes in porosity volume and position by replacing the object grid with a graph-like sub-grid typically consisting of one up to a few hundred FUs, which drastically reduces calculation times in particular for geometrically complex objects such as engine blocks, where several million mesh elements are required to represent the object geometry. These reduced calculation times allow for dynamically adjusting the casting layout and boundary conditions of the simulation process and running many simulations in search for an optimum casting design and process set-up for minimizing, eliminating or optimizing porosity-related defects, thereby effectively improving the final quality of the object to be cast.

In an embodiment, calculating the change in quantity and position of porosity in each of the at least one feeding units comprises using the continuity equation together with Darcy's Law, by calculating the total volume of metal inflow and outflow between a feeding unit and its adjacent feeding units and calculating metal shrinkage in the feeding units.

In a possible implementation form of the first aspect, calculating the change in quantity and position of porosity in each of the at least one feeding units comprises iteratively solving a coupled equation system M by:

determining a total unit volume $V_i$ and an initial porosity volume $V_i^{p,0}$ for each feeding unit; and calculating the transient change in porosity volume in each feeding unit according to equation type A:

$$\frac{\partial V_i^p}{\partial t} = -\frac{\partial V_i}{\partial t} + \sum_j \alpha_{ij} P_{ij}$$

wherein $\partial V_i^p/\partial t$ represents the rate of porosity volume change in the feeding unit, $\partial V_i/\partial t$ represents the rate of volumetric shrinkage in the feeding unit due to cooling and phase transformation, and $\Sigma_j \alpha_{ij} P_{ij}$ represents the volume of metal exchange (inflow and outflow) between the feeding unit and all adjacent feeding units;

wherein the porosity volume $V_i^p$ in each feeding unit is calculated as the sum of the initial porosity volume $V_i^{p,0}$ and the transient change in porosity volume $\partial V_i^p/\partial t$ using $$V_i^p = V_i^{p,0} + \frac{\partial V_i^p}{\partial t} \Delta t$$

and wherein if the calculated porosity volume in any feeding unit is less than zero, $V_i^p<0$, the equation system is solved again by assigning zero porosity for these feeding units, $V_i^{p,0}=0$, and replacing equation type A with equation type B:

$$0 = -\frac{\partial V_i}{\partial t} + \sum_j \alpha_{ij} P_i - \sum_j \alpha_{ij} P_j$$

wherein $\partial V_i/\partial t$ represents the rate of volumetric shrinkage in the feeding unit, and $\Sigma_j \alpha_{ij} P_i$ represents the total volume of metal inflow to the feeding unit from all adjacent feeding units, and $\Sigma_j \alpha_{ij} P_j$ represents the total volume of metal outflow from the feeding unit to all adjacent feeding units.

In a further possible implementation form of the first aspect, calculating the total volume of metal exchange (inflow and outflow) between a feeding unit and its adjacent feeding units comprises:

calculating the feeding affinity $\alpha_{ij}$ between adjacent feeding units by dividing the equivalent interface area $A^{eq}_{ij}$ by the equivalent channel length $l^{eq}_{ij}$ between the adjacent feeding units:

$$\alpha_{ij} = \frac{A_{ij}^{eq}}{l_{ij}^{eq}}$$

wherein the equivalent interface area $A^{eq}_{ij}$ is calculated by integrating the permeability $K_a$ between adjacent feeding units as a function of fraction liquid $f_l$ over the interface area S separating the adjacent feeding units:

$$A_{ij}^{eq} = \int_{S_{ij}} K_a(f_l) dS_{ij}$$

and wherein the equivalent channel length $l^{eq}_{ij}$ is defined as the sum of the shortest distances between the interface area and the location of either the largest fraction liquid value or an empirical critical fraction liquid value $f_l^{crit}$, whichever is smaller, in each feeding unit respectively:

$$l_{ij}^{eq} = l_i + l_j$$

and calculating the pressure difference $P_{ij}$ between adjacent feeding units, according to the Darcy equation:

$$\frac{u}{K_a} = -\nabla P + \rho g$$

integrated from $P_i$ to $P_j$:

$$\frac{u_{ij} \cdot l_{ij}}{K_a} = P_i - P_j - \rho g \Delta h_{ij}$$

wherein, assuming fluid flow through porous media, the pressure difference $P_{ij}$ can be calculated as:

$$P_{ij} = P_i - P_j - \rho g \Delta h_{ij}$$

wherein $u_{ij}$ is the velocity of the liquid metal flow between adjacent feeding units, $l_{ij}$ is the equivalent channel length between adjacent feeding units, $K_a$ is the permeability between adjacent feeding units, $P_i$ and $P_j$ are the equivalent pressures in the adjacent feeding units, which can be initially assigned a value of either zero or the atmospheric pressure, depending on whether the feeding unit is in contact with an external boundary (air) or not, $\Delta h_{ij}$ is the vertical height difference between the highest positions of liquid metal between the adjacent feeding units, ρ is the density of the metal, and g is the gravitational acceleration.

In a further possible implementation form of the first aspect, the permeability $K_a$ between adjacent feeding units is calculated according to the Kozeny-Carman law as a function of the local fraction liquid $f_l$ and a predetermined porous media dependent constant $K_O$:

$$K_a(f_l) = K_O \frac{f_l^3}{(1-f_l)^2}$$

wherein the equivalent interface area $A^{eq}_{ij}$ is thus calculated as:

$$A_{ij}^{eq} = K_O \int_{S_{ij}} \frac{f_l^3}{(1-f_l)^2} dS_{ij}$$

In a further possible implementation form of the first aspect, the method further comprises determining the position of the change in porosity in each feeding unit with a positive porosity value by comparing the maximum fraction liquid value $f_{l,max}$ in the feeding unit to a material-dependent fraction liquid value $f_{l,0}$, wherein if $f_{l,max} > f_{l,0}$ then the change in porosity is placed at the highest point of the feeding unit, otherwise the change in porosity is placed in the center of the "hot spot" of the feeding unit, wherein the center of the "hot spot" is determined as the 3D cell where the fraction liquid value is the maximum fraction liquid value $f_{l,max}$.

In a further possible implementation form of the first aspect, the material-dependent fraction liquid value ranges between $20\% < f_{l,0} < 95\%$, e.g. in case of a cast iron alloy containing a graphite eutectic, more preferably between $85\% < f_{l,0} < 90\%$.

In a further possible implementation form of the first aspect, the method further comprises:

determining at least one calculation domain within the solution domain based on the fraction liquid distribution ($F_l$), wherein each calculation domain is defined as a group of interconnected 3D cells with a fraction liquid value higher than zero $f_l > 0$ (a "melt zone") bordered by either 3D cells of the 3D mesh with a fraction liquid value equal to zero $f_l = 0$ (completely solidified metal) or a non-metal boundary (core, mold, air, etc.), and calculating changes in porosity distributions in each calculation domain separately by determining at least one feeding unit within each calculation domain, and calculating changes in quantity and position of porosity volume in each of the at least one feeding units within each calculation domain.

In a further possible implementation form of the first aspect solving the transient equations comprises:

calculating a temperature distribution for the solution domain using energy transport (such as heat conduction) equations, and applying a solidification model using the temperature distribution; wherein calculating metal shrinkage in the feeding units due to cooling is based on at least one of the temperature distribution or the applied solidification model; and wherein calculating the fraction liquid distribution ($F_l$) for the solution domain uses the solidification model.

In a further possible implementation form of the first aspect, the method further comprises:

determining at least one simulation result for the solution domain, based on the calculated porosity volume $V_i^P$ (and position) in each feeding unit, for at least one time step of the solidification process, and providing the at least one simulation result to a user.

In a further possible implementation form of the first aspect the method further comprises:

determining a starting time $t_0$ for the simulation of the solidification process;

optionally determining a time step increment dt for the simulation;

determining a sequence of simulation results for the solution domain at consecutive time steps after the starting time $t_0$ at least until a time step of complete solidification, in an iterative manner, wherein the time step of complete solidification is determined based on the calculated fraction liquid $f_l$ distribution as the time step wherein fraction liquid $f_l = 0$ for the whole solution domain;

optionally determining additional simulation results after the time step of complete solidification during a further cooling process of the cast metal object; and providing the sequence of simulation results to a user via a user interface device.

In a further possible implementation form of the first aspect, the at least one simulation result is mapped onto the 3D computer model, and the mapped simulation results are provided to a user via a user interface device.

In a further possible implementation form of the first aspect, the method further comprises:

predicting at least one porosity defect based at least in part on the calculated change in quantity and position of a porosity volume in at least one of the feeding units for at least one time step of the solidification process, and thereby predicting the quality of the object to be cast.

In a further possible implementation form of the first aspect, the method further comprises:

determining at least one of an optimized location of a feeder or feed aid (such as a chill, insulation padding, or exothermic material) or optimized process (boundary) conditions to be used in the metal casting process or modifying the design of the cast metal object itself based at least in part on the calculated change in quantity and position of porosity in at least one of the feeding units for at least one time step of the solidification process, in order to minimize or eliminate the porosity, or to change the position of the porosity.

In a further possible implementation form of the first aspect, the method further comprises:

receiving a user input comprising a modified characteristic of at least one of the 3D computer model, or a location of at least one feeder or feed aid (such as a chill, insulation padding or exothermic material) or the process (boundary) conditions to be used in the metal casting process;

determining at least one updated simulation result for the metal casting process based on a re-calculated change in quantity and position of porosity in each feeding unit based on the modified characteristic; and providing the at least one updated simulation result to a user.

According to a second aspect, there is provided a system comprising:

a user interface device;

a computer-readable storage device including a program product; and one or more processors operable to execute the program product, interact with the user interface device, and perform operations according to the methods of any one of the possible implementation forms of the first aspect.

According to a third aspect, there is provided a program product, encoded on a computer-readable storage device, operable to cause one or more processors to perform operations according to the methods of any one of the possible implementation forms of the first aspect.

These and other aspects will be apparent from the embodiment(s) described below.

BRIEF DESCRIPTION OF THE DRAWINGS

In the following detailed portion of the present disclosure, the aspects, embodiments and implementations will be explained in more detail with reference to the example embodiments shown in the drawings, in which.

DETAILED DESCRIPTION

In the following detailed description, a method for improving a process of casting a metal object 1 in a cavity in a mold by determining porosity due to shrinkage in the metal object 1 is described.

Physically, the method according to the present disclosure uses an existing approach for calculating fluid flow through porous media according to the Darcy equation, calculating fluid pressure drops for laminar flow through porous media according to the Kozeny-Carman law, and the continuity equation taking into account volume changes due to changes in porosity and metal shrinkage.

In existing approaches, the geometry of the solution domain is meshed by a grid and, depending on the numerical method, the unknown field values (in the case of the Darcy equation, a pressure field) will be placed in the nodes or center of the elements. In contrast, the method according to the present disclosure uses the fraction liquid distribution field, calculated in an ordinary way on the usual numerical grid, to create a second order, graph-like sub-grid to calculate pressures and porosity. An element of this sub-grid corresponds to a so-called feeding unit (FU). The subdivision of the calculation domains (depending on the actual time step in the solidification process and whether there are any calculation domains determined within a solution domain) into FUs is done by finding minima in the fraction liquid distribution field. The surface separating two neighboring FUs is defined as an interface area, which then uniquely determines the subdivision of the calculation domain into the FUs. Below the method will be described in detail with reference to exemplary embodiments and illustrative figures.

Figure 1:
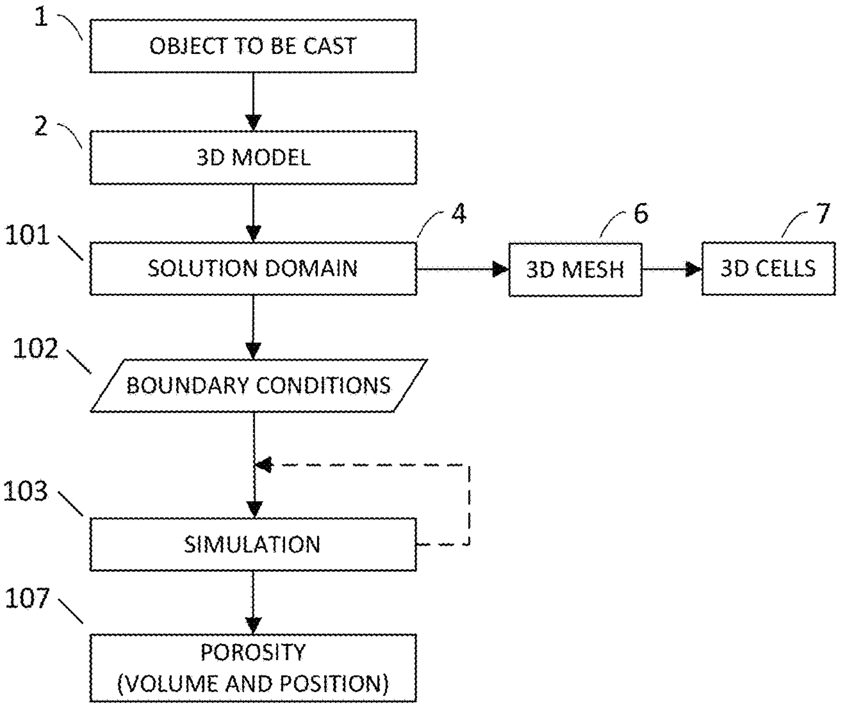
FIG. 1 is a flow diagram illustrating a method for determining a change in porosity at a given time of a metal casting process according to a possible implementation of the first aspect.

FIG. 1 is a flow diagram illustrating the main steps of the method for determining change in porosity in an object during a metal casting process according to the present disclosure, by simulating at least one time step of a solidification process, preferably the whole solidification process of the casting until the object is completely solidified.

In an initial step a 3D computer model 2 is provided defining the geometry of at least the metal object 1 to be cast. This 3D computer model 2 can comprise the 3D model of the object 1 and/or the 3D model of the cavity designed to be filled with liquid metal during the metal casting process, and may further include the geometry and location of feeders 17 and feed aids 18 such as a chill or insulation padding, as illustrated in FIGS. 20B-20C, or other materials such as the mold, cores etc.

In a next step, a solution domain 4 is discretized 101 based on the 3D computer model 2 to form a 3D mesh 6 with a plurality of 3D cells 7.

In a next step 102, process specific boundary conditions are specified. The requisite data to be input in this step may include properties of the casting materials and mold materials; process variables which are employed in practicing the actual casting such as molten metal temperature or gas content in the molten metal; environmental or external boundary conditions between the solution domain 4 and its neighborhood; and heat transfer coefficients between discretized materials as well as between outer surfaces of materials within the solution domain 4 to "virtual materials" which belong to the process but are not part of the solution domain 4.

Following the above described preparation steps, a simulation 103 of at least one time step of the solidification process of the metal object 1 during casting is run based on the specified process specific boundary conditions. For more than one time step of the solidification process, the simulation is run in an iterative manner, as will be described below, at least until the solution domain 4 or the concerned part of the solution domain 4 is completely solidified.

As a result of the simulation 103, a change in porosity volume (and, optionally, position of this porosity volume change) for a portion or the whole solution domain 4 is calculated 107, as will be described below in more detail.

Figure 2:
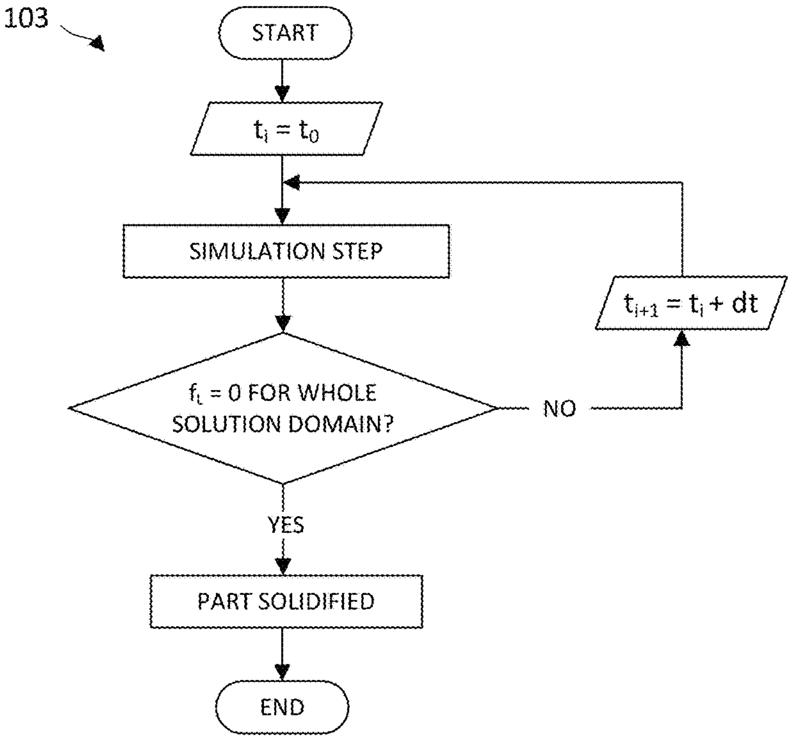
FIG. 2 is a flow diagram illustrating the iterative simulation steps of the solidification process according to a possible implementation of the first aspect.

As FIG. 2 illustrates, the simulation 103 may be run for multiple time steps of the solidification process by determining a starting time $t_0$ of the simulation and optionally a time step increment dt, and then determining a sequence of simulation results for the solution domain 4 at consecutive time steps after the starting time $t_0$ until a final time step in an iterative manner. Herein, the final time step is determined as the time step where the solution domain 4 is completely solidified, however it is common to determine additional simulation results for further time steps after complete solidification, e.g. until the cast object is cooled to below a predefined temperature level or for a predefined time. The complete solidification is determined based on the calculated fraction liquid distribution $F_l$, when the fraction liquid $f_l=0$ for the whole solution domain 4. As long as this condition is not fulfilled, the simulation time will be increased, e.g. with the determined time step increment dt and the simulation is run again for $t_{i+1}=t_i+dt$.

Figure 3:
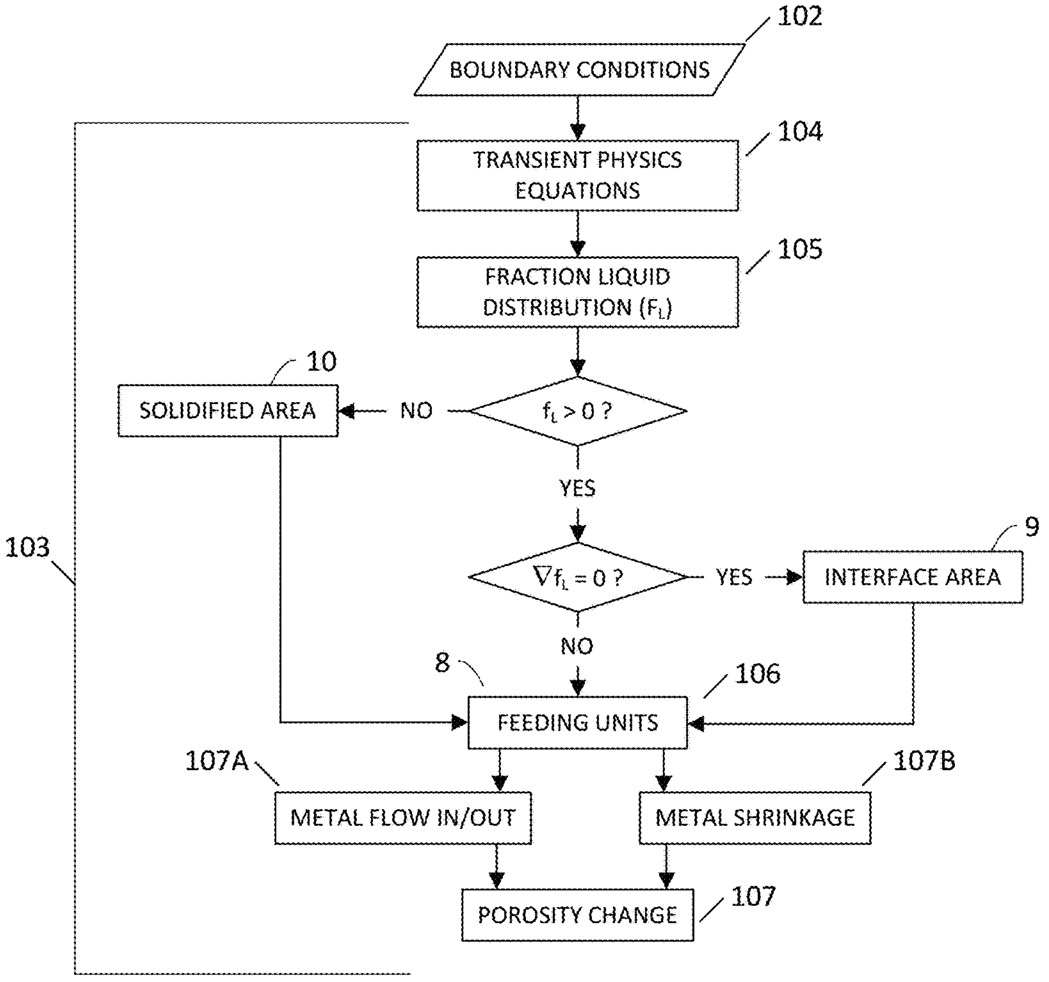
FIG. 3 is a flow diagram illustrating the main calculation steps of each time step of the solidification process according to a possible implementation of the first aspect.

FIG. 3 illustrates the main steps of the iterative simulation 103 for one time step of the solidification process.

Following the previously described preparation steps, the simulation 103 is run based on the above specified process specific boundary conditions 102.

For each time step of the iterative simulation 103, transient equations representing the transient physics of the solidification process are solved 104 for at least a portion of the solution domain 4, using the above defined boundary conditions. These transient equations may relate to different physical processes during the solidification, such as heat exchange, macroscopic convection and phase transformations. As one important result of solving these transient equations, the fraction liquid distribution $F_l$ is calculated 105 for at least a portion of the solution domain 4. Herein, fraction liquid $f_l$ is defined as the fraction of liquid metal in each of the 3D cells 7.

In a next step 106, based on the fraction liquid distribution $F_l$ determined above, at least one feeding unit 8 (usually at least two feeding units 8) is determined within the solution domain 4, whereby groups of interconnected 3D cells 7 with an associated fraction liquid value greater than zero $f_l>0$ and a fraction liquid gradient value not equal to (higher or lower than) zero $\nabla f_l <> 0$ are defined as a feeding unit (FU) 8.

Groups of interconnected 3D cells 7 separating any two adjacent feeding units 8 and having an associated fraction liquid value greater than zero $f_l>0$ and a fraction liquid gradient with an associated value of zero $\nabla f_l=0$ are defined as an interface area 9, and remaining groups of interconnected 3D cells 7 with an associated fraction liquid value equal to zero $f_l=0$ are defined as solidified areas 10.

Figure 7:
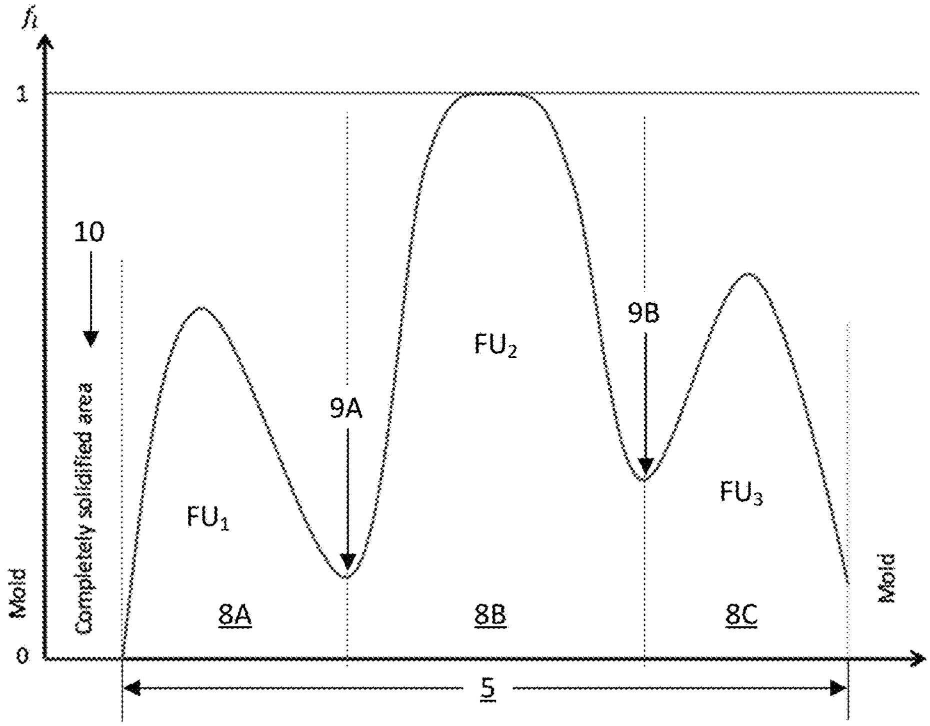
FIG. 7 is a simplified graph illustrating the separation of the casting into calculation domains and feeding units.

In other words, as also illustrated in FIG. 7, interface areas 9A,9B are located as local minima in the fraction liquid field where the fraction liquid gradient $\nabla f_l$ changes its prefix (on one side $\nabla f_l>0$ and on the other side $\nabla f_l<0$) and where thus $\nabla f_l=0$, and the feeding units 8A,8B,8C are determined between these located interface areas 9A,9B and fields with a fraction liquid value equal to zero $f_l=0$ (which may be solidified areas 10 or a non-metal boundary such as core, mold, air, etc.).

In a next step 107, after defining the solidified areas 10, the feeding units 8 and interface areas 9 in between, a change in porosity volume $V_i^P$ and/or position in each of the feeding units 8 is calculated using the continuity equation together with Darcy's Law, wherein the porosity volume $V_i^P$ is essentially a result of calculating 107A the total volume of metal inflow and outflow between a feeding unit 8 and its adjacent feeding units 8 and calculating 107B metal shrinkage in the feeding units 8, as will be described below in more detail.

Figure 4:
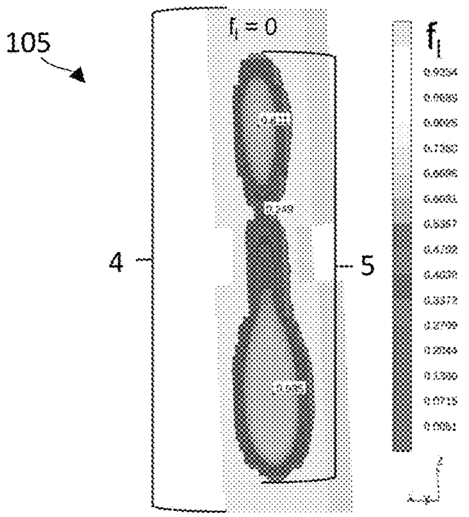
FIG. 4 is an illustration of a solution domain 4, including a calculation domain 5 as determined based on fraction liquid distribution in a part of a cast object.

FIG. 4 is a 3D illustration of a fraction liquid distribution field mapped onto a 3D model 2 of a cast object, shown in a 3D model of a mold. A solution domain 4 herein is defined as the part of the 3D model of the object 1 to be cast, which can be bordered by a non-metal boundary (core, mold, air, etc.). The volume area within the solution domain 4 having fraction liquid values $f_l>0$ represents a calculation domain 5, as will be explained below in more detail.

Figure 5:
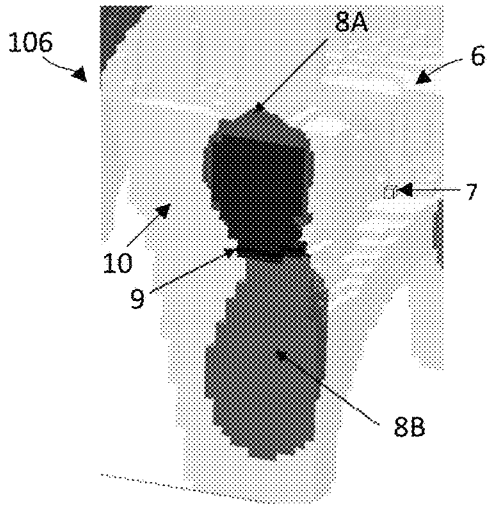
FIG. 5 is an illustration of feeding units determined within a calculation domain 5 based on fraction liquid distribution in a part of a cast object.

FIG. 5 is a 3D illustration of two feeding units 8A,8B and an interface area 9 in between, surrounded by a solidified area 10, determined based on fraction liquid distribution $F_l$ in a 3D model 2 of a cast object 1 such as shown in FIG. 4 as described above in greater detail. As shown, the feeding units 8 can be surrounded by one or more of (a) interface area(s) 9 to other feeding unit(s), (b) the mold wall, (c) completely solidified areas 10 of the casting, or (c) the atmosphere.

Figure 6:
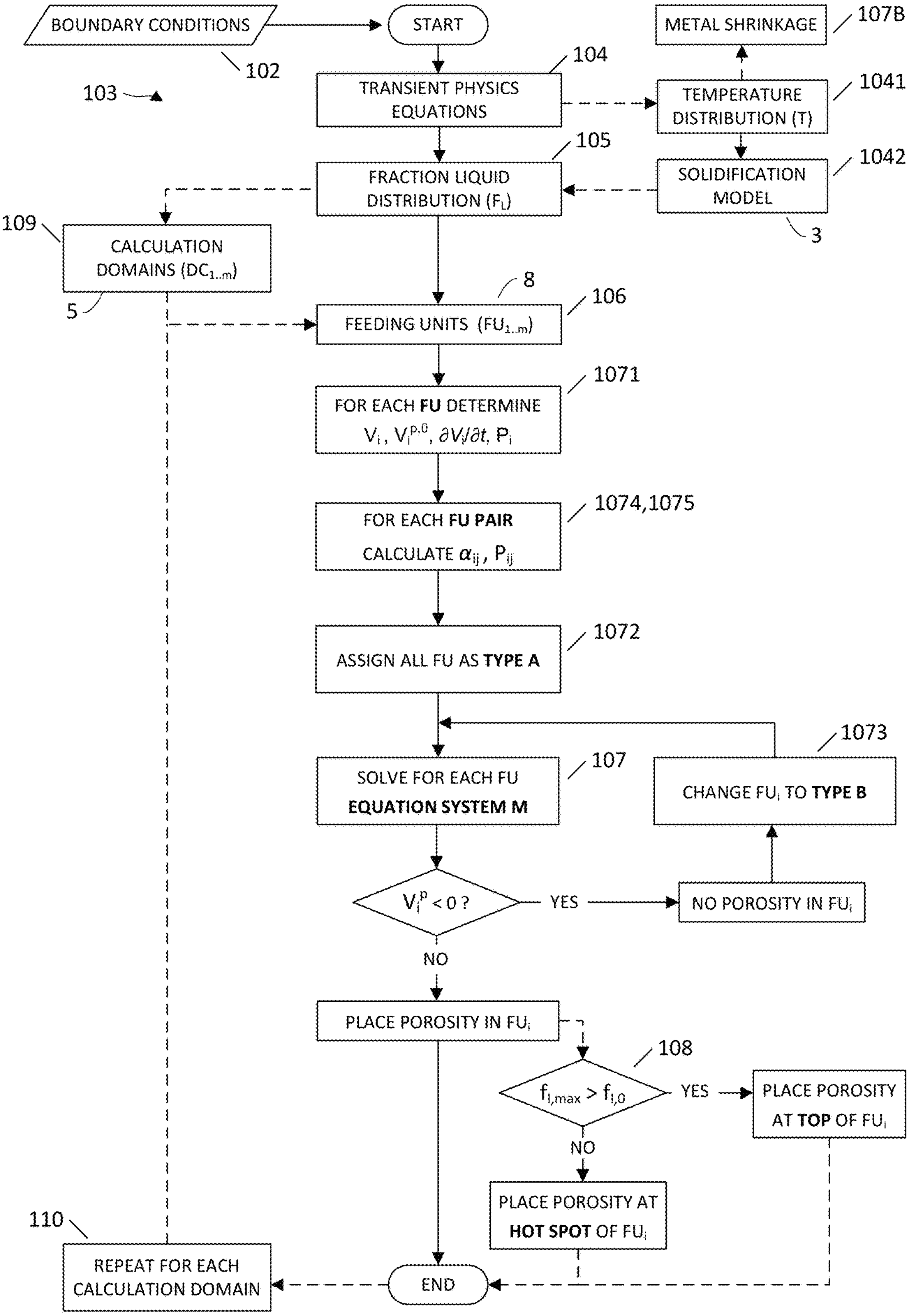
FIG. 6 is a flow diagram illustrating detailed method steps for determining changes in porosity volumes and positions in feeding units of multiple calculation domains at a given time of a metal casting process.

FIG. 6 is a flow diagram illustrating detailed method steps for determining changes is porosity volumes and positions in feeding units 8 of multiple calculation domains 5 at a given time step of a solidification process during metal casting. Steps and features that are the same or similar to corresponding steps and features previously described or shown herein are denoted by the same reference numeral as previously used for simplicity.

Similarly as described above, the process of determining a change in porosity starts with providing a 3D computer model 2 of the metal object 1 to be cast (or its mold) based on which a solution domain 4 is discretized 103 to form a 3D mesh 6 with a plurality of 3D cells 7 (not shown in this figure), and specifying 102 process specific boundary conditions.

Following these preparatory steps, a simulation 103 of at least one time step of the solidification process is run in an iterative manner, as described before.

In an initial step 104 of the simulation 103, as part of solving transient equations representing the transient physics of the solidification process, the temperature distribution field for the solution domain 4 can be calculated 1041 using standard energy transport equations, and a solidification model 3 can be applied 1042 using the temperature distribution. The temperature distribution field and/or the solidification model 3 can further be used for calculating 107B metal shrinkage in the feeding units 8 due to cooling.

Calculating 105 the fraction liquid $f_l$ distribution field for the solution domain 4 may then be based on using this solidification model 3.

In a next step 109, the casting solution domain 4 can be divided into calculation domains (DC) 5, based on the fraction liquid distribution $F_l$, whereby each calculation domain 5 is defined by a linked melt zone of interconnected 3D cells 7 with a fraction liquid $f_l>0$, bordered by completely solidified metal ($f_l=0$) or a non-metal boundary (such as core, mold, air etc.). The calculation of the porosity distribution can then be carried out 110 for each calculation domain 5 separately for each time step of the solidification by determining at least one feeding unit 8 within each calculation domain 5, and calculating the porosity change in each of the at least one feeding units 8 within each calculation domain 5.

The next step 106 of subdivision of the determined calculation domain(s) 5 into FUs 8 is then carried out, as described above, by finding minima in the fraction liquid $f_l$ field to locate interface areas 9 separating two neighboring FUs formed by 3D cells 7 in which the fraction liquid gradient $\nabla f_l$ is equal to zero and where the fraction liquid gradient $\nabla f_l$ changes its prefix (on one side $\nabla f_l>0$ and on the other side $\nabla f_l<0$). This condition uniquely determines the subdivision of the calculation domain(s) 5 into the FUs 8. FIG. 7 is a simplified graph illustrating this separation of a calculation domain 5 into feeding units 8A,8B,8C and interface areas 9A,9B located in between, the calculation domain 5 being bordered by solidified metal 10 on one side and the mold on the other side.

In a next step 1071, for each FU 8, values are assigned or calculated, where $V_i$ is calculated as the total volume of a $FU_i$; $V_i^{p,t}$ is the empty volume (porosity) of a $FU_i$ (assigned as an initial porosity volume $V_i^{p,0}$ for each feeding unit 8 at t=0, or calculated based on the porosity values from a previous time step); ∂Vi/∂t is defined as the rate of volumetric shrinkage in the $FU_i$ due to cooling and phase transformation in the current time step; and $P_i$ is defined as the equivalent pressure of the $FU_i$. The pressure may be set either to zero or to atmospheric pressure, depending on whether the FU 8 is in contact with an external boundary (air) or not.

Figure 8:
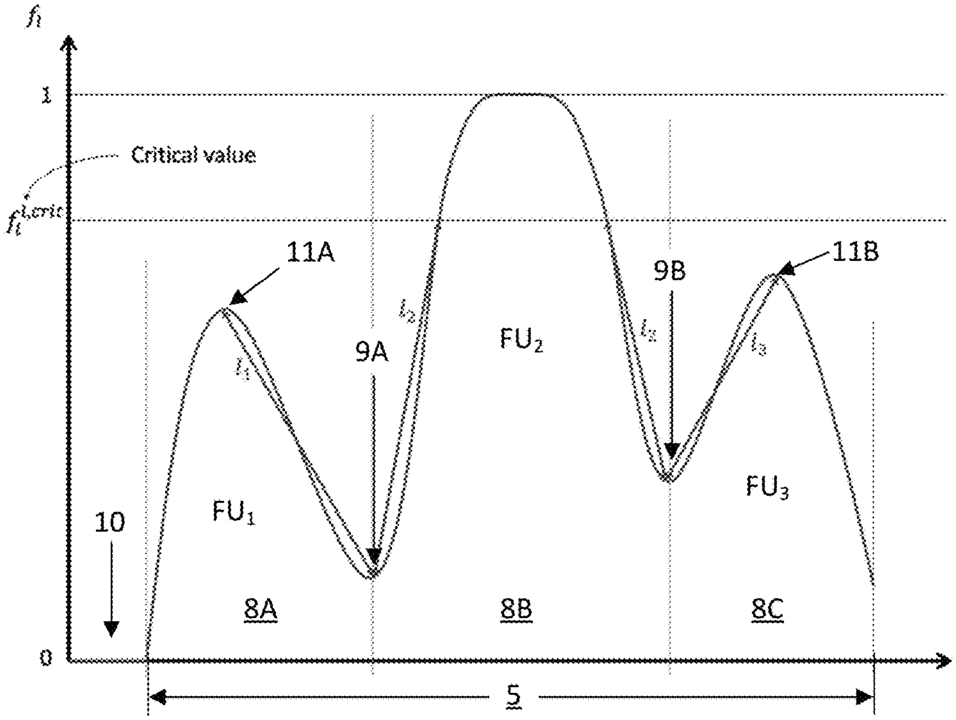
FIG. 8 is a simplified graph illustrating the determination of the equivalent channel length between two feeding units.
Figure 9:
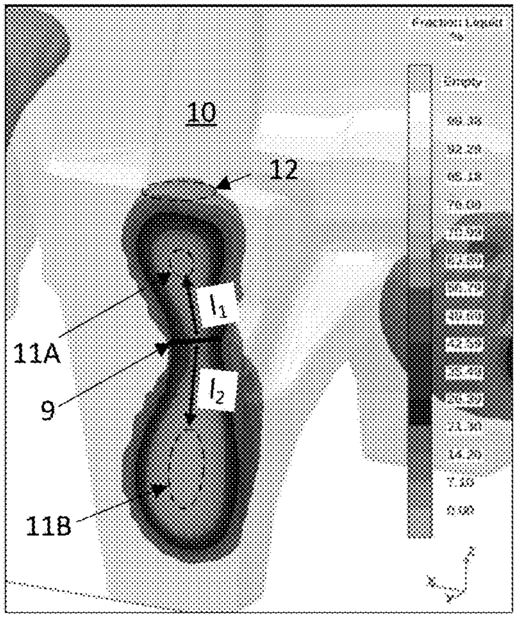
FIG. 9 is a 3D illustration of the determination of the equivalent channel length between two feeding units.
Figure 10:
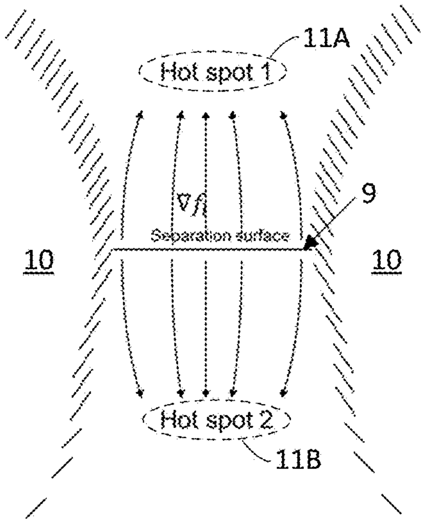
FIG. 10 is a schematic illustration of the interface area (separation surface) between two feeding units based on the gradient in the fraction liquid distribution.

In a next step 1074, the method-specific feeding affinity $\alpha_{ij}$ calculation is done by dividing the permeability, integrated over the surface separating two adjacent feeding units $FU_i$ and $FU_j$ by an equivalent channel length $l^{eq}_{ij}$ between these two FUs 8. The term "feeding affinity" illustrates the relative "ease" with which two feeding units 8 can feed each other, wherein the "equivalent channel length" refers to the shortest distance between the interface area 9 (the surface separating the two feeding units 8) and the location of either the largest fraction liquid value or an empirical critical fraction liquid value $f_l^{l,crit}$, whichever is smaller, in each feeding unit 8. The 2-D schematic in FIG. 8 illustrates this principle behind the calculation of the equivalent channel lengths, indicating "hot spots" 11A,11B within FUs 8A and 8C with the largest fraction liquid values, wherein FIG. 9 is a 3D illustration of "hot spots" 11A, 11B and a top area at the highest point 12 within feeding units 8, and measuring the equivalent channel length $l^{eq}_{ij}$ as a sum of $l_1$ and $l_2$. FIG. 10 is a further schematic illustration of the interface area 9 (separation surface) between two feeding units 8 based on the gradient in the fraction liquid distribution $F_l$.

More specifically, the feeding affinity $\alpha_{ij}$ between adjacent feeding units 8 can be calculated by dividing the equivalent interface area $A^{eq}_{ij}$ by the equivalent channel length $l^{eq}_{ij}$ between the adjacent feeding units 8 according to equation (1):

$$\alpha_{ij} = \frac{A_{ij}^{eq}}{l_{ij}^{eq}} \tag{1}$$

The equivalent interface area 9 $A^{eq}_{ij}$ can be calculated by integrating the permeability $K_a$ between adjacent feeding units 8 as a function of fraction liquid $f_l$ over the interface area 9 S separating the adjacent feeding units 8 according to equation (2):

$$A_{ij}^{eq} = \int_{S_{ij}} K_a(f_l)dS_{ij} \tag{2}$$

The equivalent channel length $l^{eq}_{ij}$ can be defined as the sum of the shortest distances between the interface area 9 and the location of either the largest fraction liquid value or an empirical critical fraction liquid value $f_l^{crit}$, whichever is smaller, in each feeding unit 8 respectively, according to equation (3):

$$l_{ij}^{eq} = l_i + l_j \tag{3}$$

In a next step 1075, the pressure difference $P_{ij}$ between adjacent feeding units can be calculated according to the Darcy equation as shown in equation (4):

$$\frac{u}{K_a} = -\nabla P + \rho g \tag{4}$$

Equation (4) integrated from $P_i$ to $P_j$ is shown in equation (5):

$$\frac{u_{ij} \cdot l_{ij}}{K_a} = P_i - P_j - \rho g \Delta h_{ij} \tag{5}$$

Assuming fluid flow through porous media, the pressure difference $P_{ij}$ can be calculated according to equation (6):

$$P_{ij} = P_i - P_j - \rho g \Delta h_{ij} \tag{6}$$

wherein

- $u_{ij}$ is the velocity of the liquid metal flow between adjacent feeding units 8,
- $l_{ij}$ is the equivalent channel length between adjacent feeding units 8,
- $K_a$ is the permeability between adjacent feeding units 8,
- $P_i$ and $P_j$ are the equivalent pressures in the adjacent feeding units 8, which can be initially assigned a value of either zero or the atmospheric pressure, depending on whether the feeding unit 8 is in contact with an external boundary air or not,
- $\Delta h_{ij}$ is the vertical height difference between the highest positions of liquid metal between the adjacent feeding units 8,
- $\rho$ is the density of the metal, and
- g is the gravitational acceleration.

In an embodiment, the permeability $K_a$ between adjacent feeding units 8 can be calculated according to the Kozeny-Carman law as a function of the local fraction liquid $f_l$ and a predetermined porous media dependent constant $K_O$ according to equation (7):

$$K_a(f_l) = K_O \frac{f_l^3}{(1 - f_l)^2} \tag{7}$$

The equivalent interface area 9 $A^{eq}_{ij}$ can thus be calculated according to equation (8):

$$A_{ij}^{eq} = K_O \int_{S_{ij}} \frac{f_l^3}{(1 - f_l)^2} dS_{ij} \tag{8}$$

In other words, in the differential formulation of Darcy's law, the fluid flow is proportional to the pressure difference $P_{ij}$ multiplied by the permeability $K_a$, wherein this permeability is a material-dependent (or better said, porous medium dependent) parameter, and in the freezing metal is usually calculated using the empirical Kozeny-Carman law taking into account the local fraction liquid value.

In the method according to the present disclosure however, the affinity $\alpha_{ij}$ is used instead of permeability. This affinity $\alpha_{ij}$ is defined for all pairs of connecting FUs 8. In contrast to the permeability, the affinity $\alpha_{ij}$ depends on the porous medium as well as on the geometrical configuration of the FU 8. Thus, the affinity $\alpha_{ij}$ can be physically interpreted as a measure of the connection between two FUs 8. The affinity calculation is done, as described above, by dividing the permeability, integrated over the surface separating two FUs, by the equivalent channel length between the two FUs 8.

The equivalent interface area $A^{eq}_{ij}$ is, to a certain degree, a "weighted" area, being weighted with the permeability over the surface.

It should be noted that the Kozeny-Carman Law is only one model for the permeability, and other permeability functions could be (and sometimes are) used.

The height difference $\Delta h_{ij}$ between two connected FUs is measured between the highest point in each feeding unit 8 where the fraction liquid is highest or the fraction liquid exceeds an empirical critical fraction liquid value $f_l^{h,crit}$, whichever is smaller, as described above.

In the next steps, an equation system M is assembled and solved for each FU 8, based on the above calculated or assigned values. In the method according to the present disclosure, this governing equation system M includes two types of equations for the calculation of change in porosity.

For FUs 8 which already have porosity, an equation type A is used. In the equation of type A, the rate of porosity growth $\partial V_i^p/\partial t$ is unknown. The equation type B is used if a FU 8 doesn't have porosity, yet. In this equation type, the pressure $P_i$ is unknown.

The equation system M is thus assembled including equations of type A and of type B for the various FUs 8, and the equation system is solved. After solution, the change in porosity of a FU 8 is found by the integration of the rate of porosity growth over the actual time step.

The method is therefore in effect an iterative solution process, wherein initially all the FUs 8 are considered to be of type A. If, due to solution of the governing equation system, the porosity in some FU 8 becomes negative, the type A will be changed to type B for this FU 8, and the equation system is solved again.

As described above, in the equations of type A, the rate of porosity volume change $\partial V_i^p/\partial t$ is considered to be unknown. As the first step 1072, the change in porosity volume in each feeding unit 8 is assigned to be calculated according to equation type A shown as equation (9):

$$\frac{\partial V_i^p}{\partial t} = -\frac{\partial V_i}{\partial t} + \Sigma_j \alpha_{ij} P_{ij} \tag{9}$$

wherein

- $\partial V_i^p/\partial t$ represents the rate of porosity volume change in the feeding unit 8,
- $\partial V_i/\partial t$ represents the rate of volumetric shrinkage in the feeding unit 8 due to cooling and phase transformation, and
- $\Sigma_i \alpha_{ij} P_{ij}$ represents the total volume of metal inflow and outflow between the feeding unit 8 and all adjacent feeding units 8.

Figure 11:
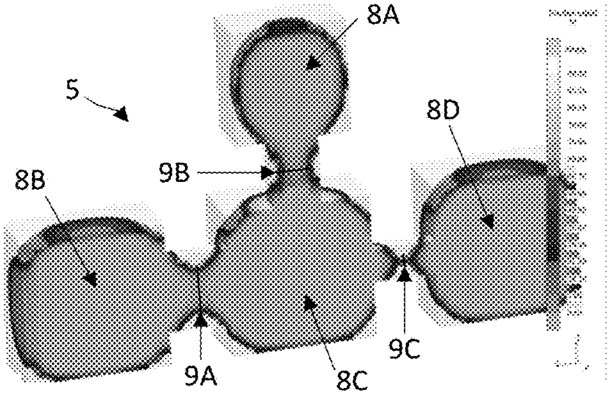
FIG. 11 is a 3D illustration of interconnecting feeding units and interface areas between the feeding units.
Figure 12:
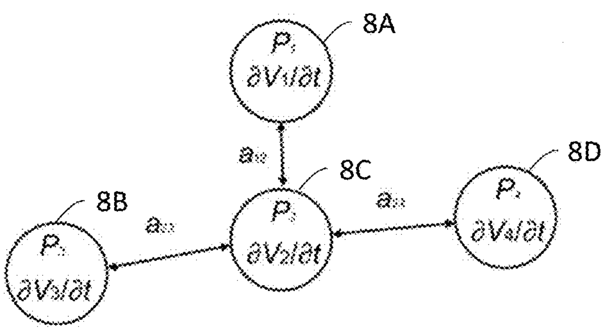
FIG. 12 is a schematic illustration of the interconnecting feeding units of FIG. 11 interpreted by the method as a graph-like sub-grid of interconnected nodes.

FIG. 11 is a 3D illustration of interconnecting feeding units 8A, 8B, 8C, 8D in a calculation domain 5 and interface areas 9A, 9B, 9C located in between, whereas FIG. 12 is a schematic illustration of these interconnecting feeding units 8A, 8B, 8C, 8D interpreted by the method of the present disclosure as a graph-like sub-grid of interconnected nodes for assigning and solving the above equations.

The equation system M is then solved 107 for each FU 8 and the new porosity volume $V_i^p$ in each FU 8 is calculated by adding the change in porosity volume $\partial V_i/\partial t$ to an initial porosity volume $V_i^{p,0}$ or to the empty volume from the previous time step $V_i^{p,t-1}$.

If the calculated porosity volume $V_i^p$ in any feeding unit 8 is less than zero, $V_i^p<0$, the equation system M is solved again by assigning 1073 zero porosity for these feeding units 8, $V_i^{p,0}=0$, and replacing equation type A with equation type B shown as equation (10):

$$0 = -\frac{\partial V_i}{\partial t} + \Sigma_j \alpha_{ij} P_i - \Sigma_j \alpha_{ij} P_j \tag{10}$$

wherein $\partial V_i/\partial t$ represents the rate of volumetric shrinkage in the feeding unit 8, and $\Sigma_j \alpha_{ij} P_i$ represents the total volume of metal inflow to the feeding unit 8 from all adjacent feeding units 8, and $\Sigma_j \alpha_{ij} P_j$ represents the total volume of metal outflow from the feeding unit 8 to all adjacent feeding units 8.

In this equations of type B, the equivalent pressure $P_i$ is considered to be unknown. In other words, the two types of equations are used with each other to calculate the final change in the porosity in a time step, as shown in the flow chart of FIG. 6.

Figure 13A:
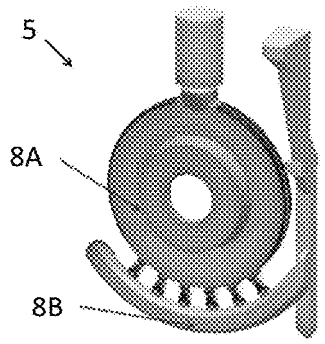
FIGS. 13A-13C illustrate how the number of calculation domains and feeding units may change dynamically during the solidification of a casting.
Figure 13B:
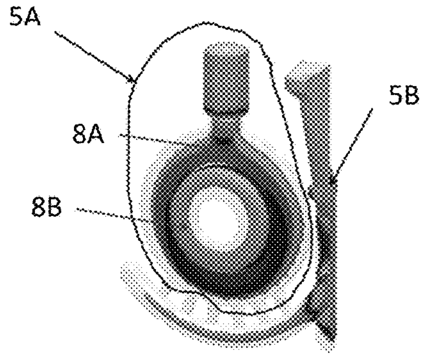
Figure 13C:
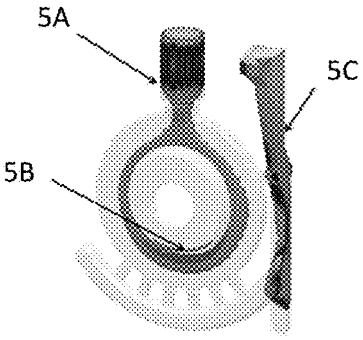

FIGS. 13A-13C further illustrate how the number of calculation domains 5 and feeding units 8 changes dynamically during the solidification of the casting.

Figure 14:
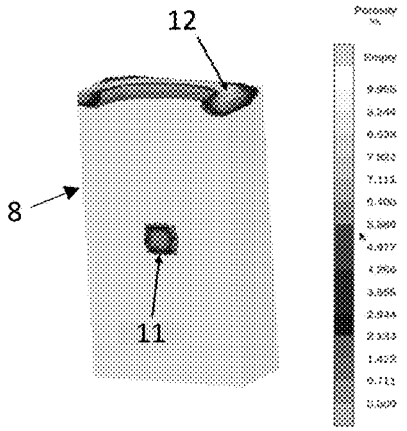
FIG. 14 is a 3D illustration of possible porosity locations in a feeding unit.
Figure 15:
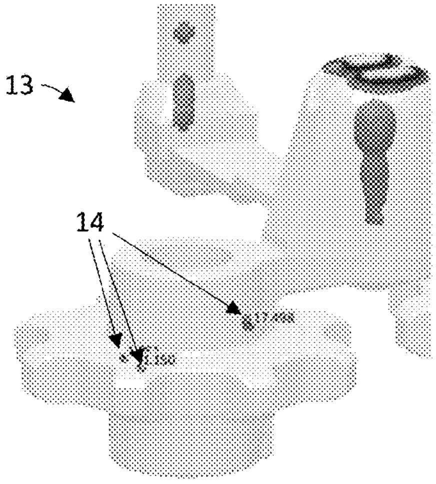
FIG. 15 is a 3D illustration of determined porosity defects mapped onto a 3D model of a cast object.

Once the porosity volume $V_i^p$ in each FU 8 is calculated, the process step either ends, or in a final step 108 the position of the change in porosity in each FU 8 with a positive porosity value is determined by comparing the maximum fraction liquid value $f_{l,max}$ in the FU 8 to a material-dependent fraction liquid value $f_{l,0}$ which is determined as an empirical value. If the maximum fraction liquid in a FU 8 is greater than $f_{l,0}$, the pore (change in porosity volume) will be placed at the top (highest point) 12 of the FU 8, otherwise it will be placed in the center of the hot spot 11 (where the value of the fraction liquid $f_l$ is at a maximum). The material-dependent fraction liquid value may range between $20\% < f_{l,0} < 95\%$. For e.g. cast iron with a graphite eutectic, the $f_{l,0}$ value may be taken around 85-90%. An example of possible porosity positions determined accordingly is illustrated in FIGS. 14 and 15.

Figure 16:
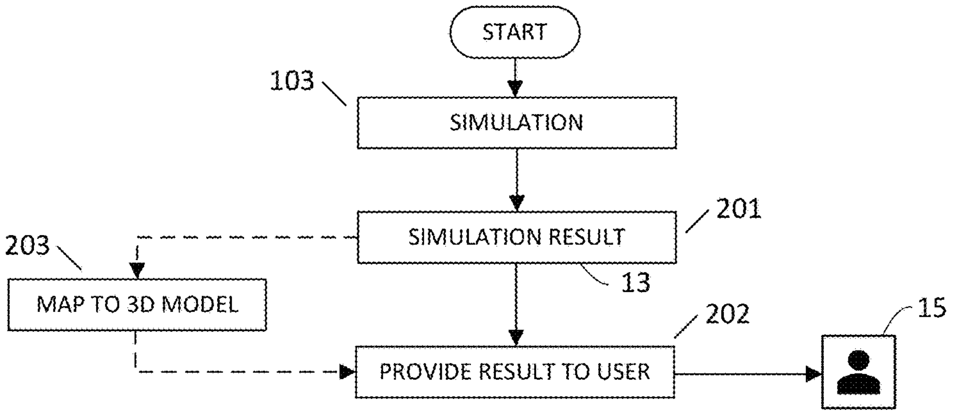
FIG. 16 is a flow diagram illustrating the main steps of determining and providing to a user simulation results at a given time of a metal casting process.

FIG. 16 is a flow diagram that illustrates the main steps of determining and providing to a user 15 simulation results 13 at any point in time of a metal casting process according to the above described method.

In a first step 201, at least one simulation result 13 for the whole solution domain 4 is determined, which may represent calculated porosity volumes $V_i^p$ and, optionally, the position of the porosity volume in each feeding unit 8, as described above with respect to steps 107 and 108. However, simulation results may also be determined without any change in porosity, but still representing valuable information to a user 15. The simulation result(s) 13 can then be provided to a user 15 as a numerical information, or can be mapped 203 onto the 3D computer model 2 and then provided 202 to a user 15 via a user interface device 24 (such as the simulation result 13 shown in FIG. 15).

However, most often one simulation result 13 for a given time of a metal casting process is only a part of a required simulation output. For effectively calculating and accurately predicting the volumes and positions of porosity defects as a result of the metal casting process and to be able to determine certain adjustments needed in the process, a time related sequence of simulation results is needed that covers the whole casting process from start to finish.

Figure 17:
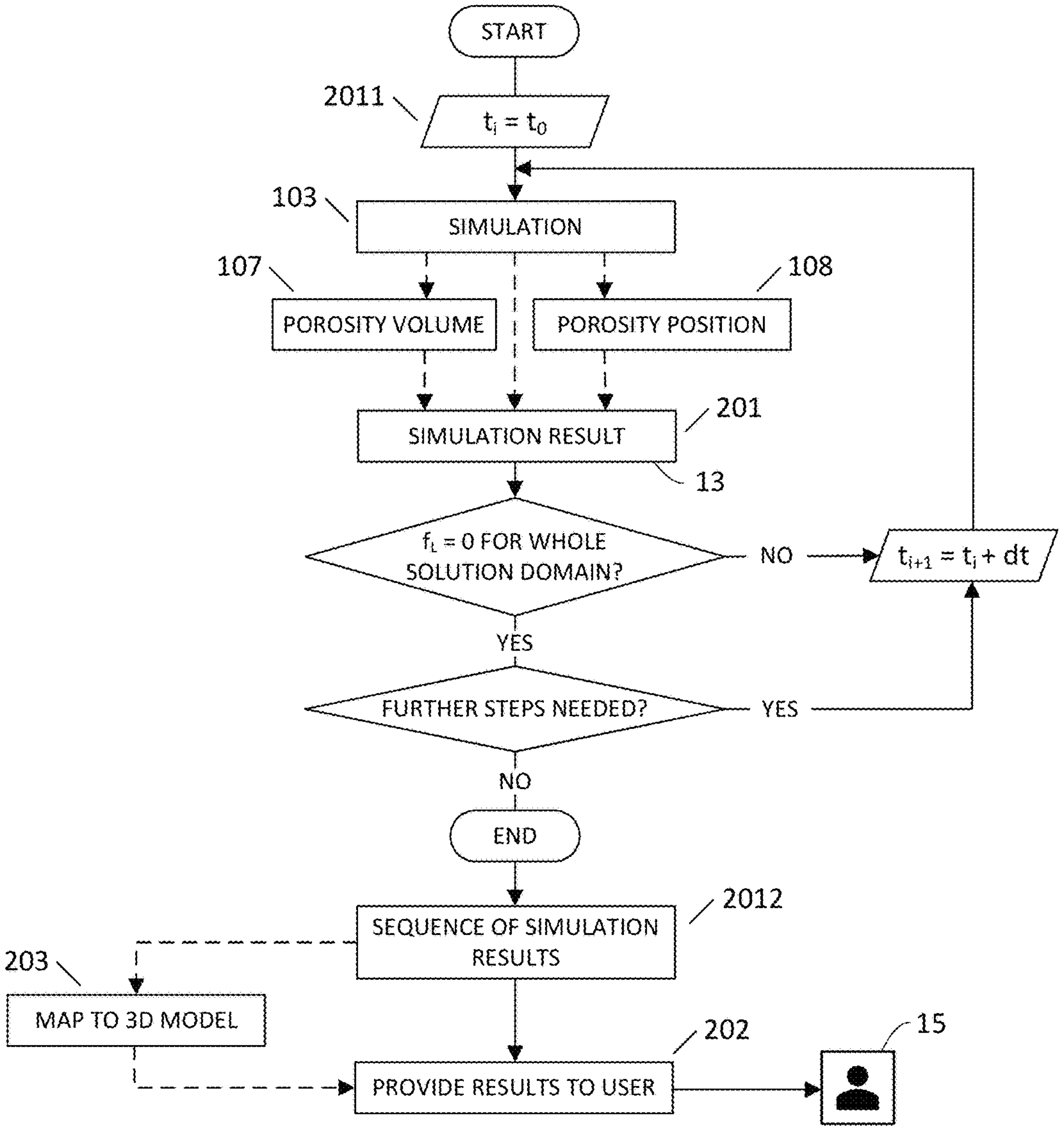
FIG. 17 is a flow diagram illustrating the main steps of determining and providing to a user a sequence of simulation results during a metal casting process.

FIG. 17 is a flow diagram illustrating the main steps of determining and providing to a user 15 such a sequence of simulation results 13.

In a first step 2011, a starting time $t=t_0$ and, optionally, a time step increment dt for a simulation of the metal casting process is determined. This time step increment dt may be a fixed value or may be adjusted dynamically during the simulation. Once these values are set, the simulation is run as described above, and simulation results 13 for the whole solution domain 4 are determined based on the calculated changes in porosity volume $V_i^p$ and position in each feeding unit 8 for the starting time $t=t_0$ of the casting process. Then the time increases to $t_{i+1}$, e.g. with the set time step increment dt and simulation results 13 are determined again for the whole solution domain 4 for the $t_{i+1}=t_i+dt$ time step of the casting process, wherein the empty volume (porosity) distribution $V^{p,t}$ is taken from the previous time step, as described previously. In this manner, a sequence of simulation results 13 for the solution domain 4 is determined at consecutive time steps after the starting time $t_0$ until a final time step. In some embodiments, the final time step is determined based on the calculated fraction liquid $f_l$ distribution as the time step wherein fraction liquid $f_l=0$ for the whole solution domain 4, whereas in other embodiments additional simulation results may be determined for further time steps after complete solidification, e.g. until the cast object is cooled to below a predefined temperature level or for a predefined time.

This sequence of simulation results 13 can then be provided 202 to a user 15 as a numerical information, or can be mapped 203 onto the 3D computer model 2 and then provided 202 to a user 15 via a user interface device 24.

FIGS. 13A-13C illustrate through such an exemplary sequence of simulation results 13 how the number of calculation domains 5 and feeding units 8 changes dynamically during the solidification of the casting.

Figure 18:
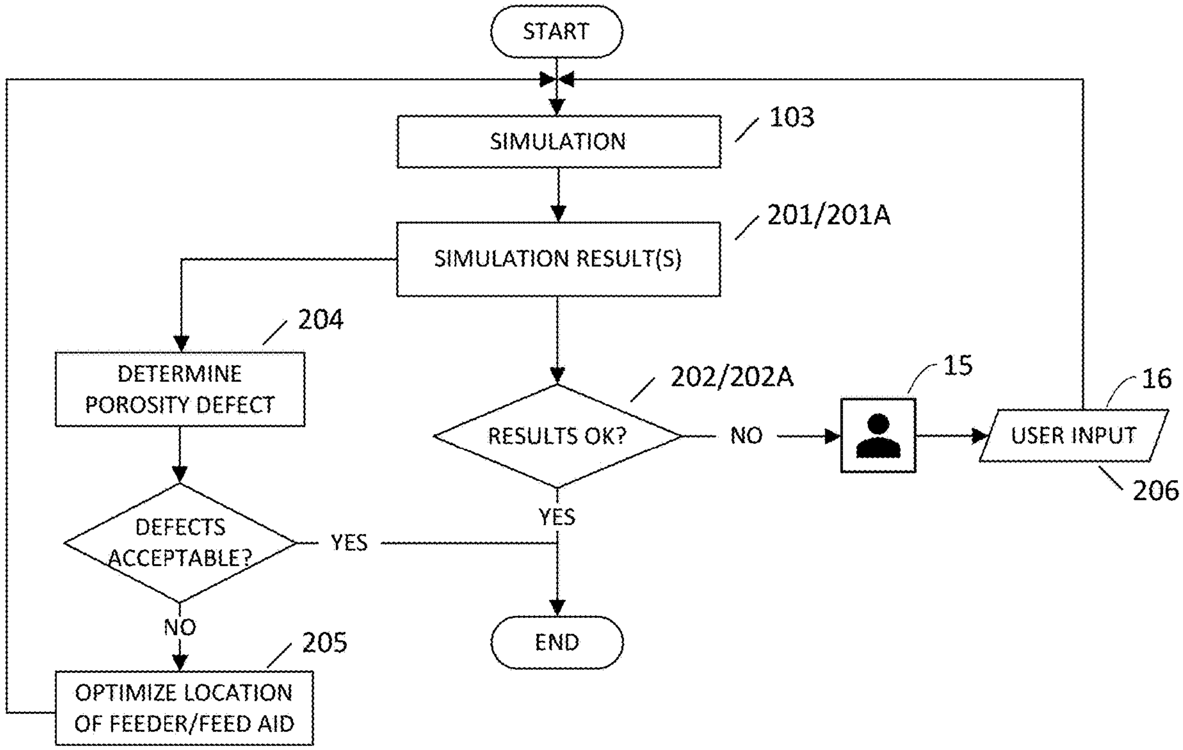
FIG. 18 is a flow diagram illustrating the main steps of adjusting casting or rigging design or casting process parameters by a user based on simulation results.

As illustrated in FIG. 18, in further possible embodiments of the method according to the present disclosure, additional steps can be provided for a user to optimize the casting process by adjusting the above described simulation process.

In one possible embodiment, after simulation results 13 are calculated, at least one porosity defect 14 is determined 204 due to shrinkage based at least in part on the calculated porosity volume $V_i^p$ and position in at least one of the feeding units 8. This enables predicting the quality of the object 1 to be cast.

Figure 19:
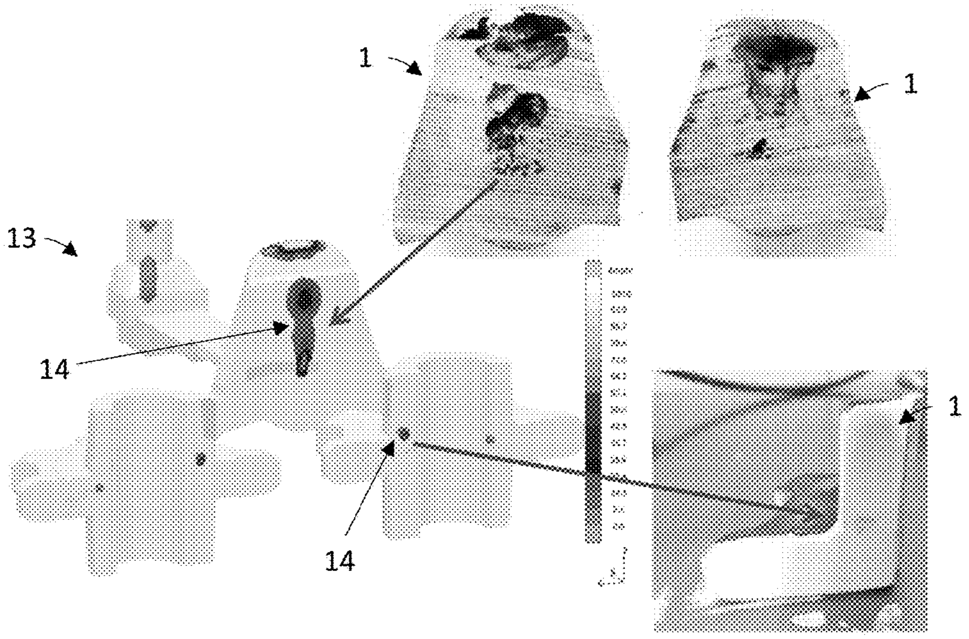
FIG. 19 is an illustration of determined porosity defects mapped onto a 3D model of a metal cast object in comparison to test castings of metal objects with the same geometry.

FIG. 15 shows such a simulation result 13 with determined porosity defects 14 mapped onto a 3D model 2 of a cast object 1, while FIG. 19 is an illustration of determined porosity defects 14 based on a simulation result 13 mapped onto a 3D model 2 of a metal cast object 1 in comparison to test castings of metal objects 1 with the same geometry.

Figure 20A:
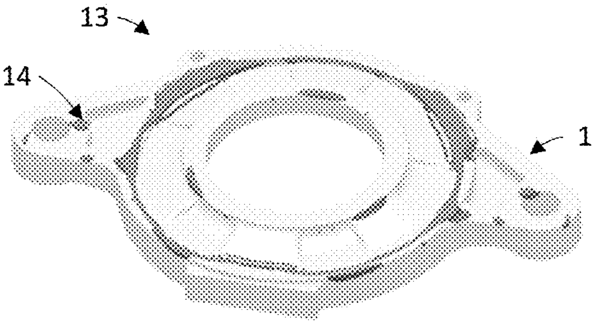
FIGS. 20A-20C illustrate possible adjustments of feeder and feed aid locations to improve casting quality through adjustment or minimization/elimination of porosity.
Figure 20B:
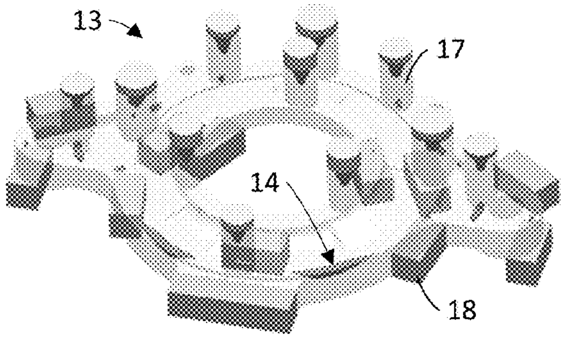
Figure 20C:
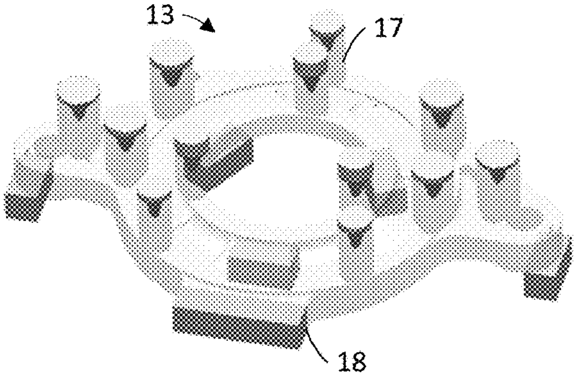

In a further possible embodiment, as illustrated throughout FIGS. 20A-20C, knowing the simulation results 13 and/or the above porosity defect 14 (see FIG. 20A), at least one of an optimized location can be determined 205 for a feeder 17 and/or feed aid 18 (such as a chill, insulation padding or exothermic material), as part of the simulation process and to be used in the metal casting process, based at least in part on the calculated porosity volume $V_i^p$ and position in at least one of the feeding units 8, in order to change the position of the porosity (see FIG. 20B) or to minimize or completely eliminate the porosity (see FIG. 20C).

In a further possible embodiment, knowing the simulation results 13 and/or the above porosity defect 14, a user input 16 can be provided and received 206 by the simulation process comprising a modified characteristic of at least one of the 3D computer model 2, or a location of at least one feeder 17 or feed aid 18 that is to be used in the metal casting process. Based on the user input 16, at least one updated simulation result 13A is then determined 201A for the metal casting process based on a re-calculated porosity volume $V_i^p$ and position in each feeding unit 8 based on the modified characteristic, and the updated simulation result(s) 13A are provided 202A to a user 15 for further evaluation. These additional adjustment steps can support an iterative process that eventually leads to minimizing or eliminating porosity defects 14, or changing the position of the porosity defects 14 to be located in a less structurally sensitive part of the metal object 1 to be cast.

Figure 21:
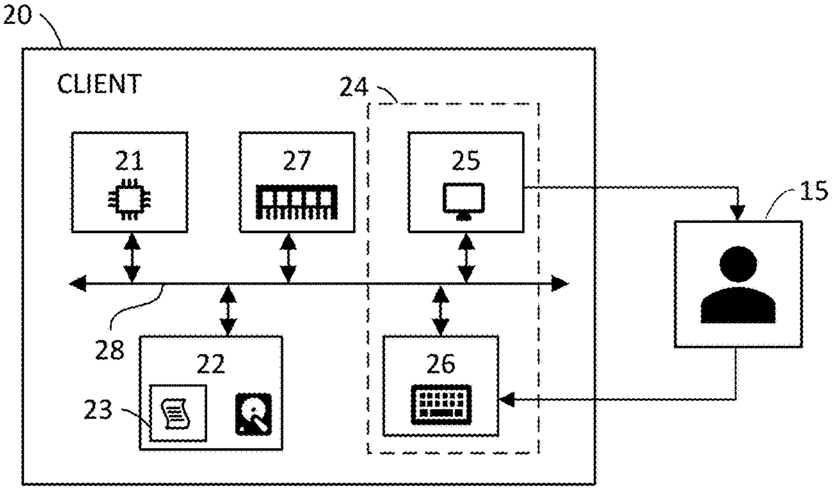
FIG. 21 is a schematic block diagram illustrating an example of a hardware configuration of a computer-based system for determining porosity in a cast metal object in accordance with the second aspect.

FIG. 21 is a schematic block diagram illustrating an example of a hardware configuration of a computer-based system 20 for determining porosity in a cast metal object 1 in accordance with the present disclosure.

The computer-based system 20 may comprise one or more processors (CPU) 21 configured to execute instructions that cause the computer-based system 20 to perform a method according to any of the possible embodiments above.

The computer-based system 20 may also comprise computer-readable storage device 22 configured for storing software-based instructions as part of a program product 23 to be executed by the CPU 21.

The computer-based system 20 may also comprise a memory 27 configured for (temporarily) storing data of applications and processes.

The computer-based system 20 may further comprise a user interface device 24 for user interaction between the system 20 and a user 15, comprising an input interface (such as a keyboard and/or mouse) 26 for receiving input from a user 15, and an output device 25 such as an electronic display for conveying information to a user 15.

The computer-based system 20 may further comprise a communication interface for communicating with external devices directly, or indirectly via a computer network.

The mentioned hardware elements within the computer-based system 20 may be connected via an internal bus 28 configured for handling data communication and processing operations.

The computer-based system 20 may further be connected to a database configured for storing data to be used as input for the above described simulations (such as material properties for cast materials, experimental data, etc.), wherein the type of connection between the two can be direct or indirect, as will be described below. The computer-based system 20 and the database can be both included in the same physical device, connected via the internal bus 28, or they can be part of physically different devices, and connected via the communication interface either directly, or indirectly via a computer network.

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

The reference signs used in the claims shall not be construed as limiting the scope.

The invention claimed is:

1. A computer-implemented method for improving a process of casting a metal object in a cavity in a mold by determining a change in quantity and position of porosity due to solidification, the method comprising:

providing a 3D computer model defining a geometry of at least the metal object to be cast;

discretizing a solution domain based on the 3D computer model to form a 3D mesh with a plurality of 3D cells;

specifying boundary conditions, the boundary conditions comprising at least material properties of materials involved in the casting;

simulating at least one time step of a solidification process of the metal object during casting based on the boundary conditions, the simulation comprising, for the at least one time step of the solidification process:

solving transient equations representing transient physics of the solidification process for a solution domain;

calculating a fraction liquid distribution $F_l$ for the solution domain, wherein fraction liquid $f_l$ is defined as a fraction of liquid metal in the 3D cells;

determining at least one feeding unit within the solution domain based on the fraction liquid distribution $F_l$, wherein a feeding unit is defined as a group of interconnected 3D cells with a fraction liquid value higher than zero $f_l>0$ and a fraction liquid gradient value not equal to zero $\nabla f_l<>0$, and wherein adjacent feeding units are separated by an interface area, wherein an interface area is defined as a group of interconnected 3D cells with a fraction liquid gradient equal to zero $\nabla f_l=0$; and calculating a change in quantity and position of porosity in each of the at least one feeding units;

determining at least one porosity defect based at least in part on the calculated change in quantity and position of porosity for at least one time step of the solidification process; and predicting a quality of the object to be cast based on the at least one porosity defect.

2. The method according to claim 1, wherein calculating the change in quantity and position of porosity in each of the at least one feeding units comprises using a continuity equation together with Darcy's Law, by calculating a total volume of metal inflow and outflow between a feeding unit and its adjacent feeding units and calculating metal shrinkage in the feeding units.

3. The method according to claim 1, wherein calculating the change in quantity and position of porosity in each of the at least one feeding units comprises iteratively solving a coupled equation system M by:

determining a total unit volume $V_i$ and an initial porosity volume $V_i^{p,0}$ for each feeding unit; and calculating a transient change in porosity volume in each feeding unit according to equation type A:

$$\frac{\partial V_i^p}{\partial t} = -\frac{\partial V_i}{\partial t} + \sum_j \alpha_{ij} P_{ij}$$

wherein $\partial V_i^p/\partial t$ represents a rate of porosity volume change in the feeding unit, $\partial V_i/\partial t$ represents a rate of volumetric shrinkage in the feeding unit due to cooling and phase transformation, and $\Sigma_j \alpha_{ij} P_{ij}$ represents a total volume of metal inflow and outflow between the feeding unit and all adjacent feeding units;

wherein a porosity volume $V_i^p$ in each feeding unit is calculated as a sum of an initial porosity volume $V_i^{p,0}$ and a transient change in porosity volume $\partial V_i^p/\partial t$; and wherein if the calculated porosity volume in any feeding unit is less than zero, $V_i^p<0$, the equation system M is solved again by assigning zero porosity for these feeding units, $V_i^{p,0}=0$, and replacing equation type A with equation type B:

$$0 = -\frac{\partial V_i}{\partial t} + \sum_j \alpha_{ij} P_i - \sum_j \alpha_{ij} P_j$$

wherein $\partial V_i/\partial t$ represents the rate of volumetric shrinkage in the feeding unit, and $\Sigma_j \alpha_{ij} P_i$ represents the total volume of metal inflow to the feeding unit from all adjacent feeding units, and $\Sigma_j \alpha_{ij} P_j$ represents the total volume of metal outflow from the feeding unit to all adjacent feeding units.

4. The method according to claim 3, wherein calculating a total volume of metal inflow and outflow between a feeding unit and its adjacent feeding units comprises:

calculating a feeding affinity aij between adjacent feeding units by dividing an equivalent interface area $A^{eq}_{ij}$ by an equivalent channel length $l^{eq}_{ij}$ between the adjacent feeding units:

$$\alpha_{ij} = \frac{A_{ij}^{eq}}{l_{ij}^{eq}}$$

wherein the equivalent interface area $A^{eq}_{ij}$ is calculated by integrating a permeability $K_a$ between adjacent feeding units as a function of fraction liquid $f_l$ over an interface area S separating the adjacent feeding units:

$$A_{ij}^{eq} = \int_{S_{ij}} K_a(f_l) dS_{ij}$$

and wherein the equivalent channel length $l^{eq}_{ij}$ is defined as a sum of shortest distances between the interface area and a location of either a largest fraction liquid value or an empirical critical fraction liquid value $$f_l^{crit},$$

whichever is smaller, in each feeding unit respectively:

$$l_{ij}^{eq} = l_i + l_j$$

and calculating a pressure difference $P_{ij}$ between adjacent feeding units, according to the equation:

$$P_{ij} = P_i - P_j - \rho g \Delta h_{ij}$$

wherein $P_i$ and $P_j$ are equivalent pressures in the adjacent feeding units, which can be initially assigned a value of either zero or atmospheric pressure, depending on whether the feeding unit is in contact with an external boundary (air) or not, $\Delta h_{ij}$ is a vertical height difference between highest positions of liquid metal between the adjacent feeding units, $\rho$ is density of a metal, and g is gravitational acceleration.

5. The method according to claim 4, wherein the permeability $K_a$ between adjacent feeding units is calculated according to Kozeny-Carman law as a function of a local fraction liquid $f_l$ and a predetermined porous media dependent constant $K_0$:

$$K_a(f_l) = K_O \frac{f_l^3}{(1 - f_l)^2}$$

and wherein an equivalent interface area $A^{eq}_{ij}$ is calculated as:

$$A_{ij}^{eq} = K_O \int_{S_{ij}} \frac{f_l^3}{(1 - f_l)^2} dS_{ij}.$$

6. The method according to claim 1, further comprising:

determining a position of the change in porosity in each feeding unit with a positive porosity value by comparing a maximum fraction liquid value $f_{l,max}$ in the feeding unit to a material-dependent fraction liquid value $f_{l,0}$, wherein if $f_{l,max}>f_{l,0}$ than the change in porosity is placed at a highest point of the feeding unit, otherwise the change in porosity is placed in a center of a hot spot of the feeding unit, wherein the center of the hot spot is determined as the 3D cell where a fraction liquid value is a maximum fraction liquid value $f_{l,max}$.

7. The method according to claim 6, wherein a material-dependent fraction liquid value ranges between $20\%<f_{l,0}<95\%$.

8. The method according to claim 1, further comprising:

determining at least one calculation domain within the solution domain based on the fraction liquid distribution $F_l$, wherein each calculation domain is defined as a group of interconnected 3D cells with a fraction liquid value higher than zero $f_l>0$ bordered by either 3D cells of the 3D mesh with a fraction liquid value equal to zero $f_l=0$ or a non-metal boundary, and calculating changes in porosity distributions in each calculation domain separately by determining at least one feeding unit within each calculation domain, and calculating changes in quantity and position of porosity in each of the at least one feeding units within each calculation domain.

9. The method according to claim 1, wherein solving the transient equations comprises:

calculating a temperature distribution for the solution domain using energy transport equations, and applying a solidification model using the temperature distribution; wherein calculating metal shrinkage in the feeding units due to cooling is based on at least one of the temperature distribution or the solidification model; and wherein calculating the fraction liquid distribution $F_l$ for the solution domain uses the solidification model.

10. The method according to claim 1, further comprising:

determining at least one simulation result for the solution domain, based on a calculated porosity volume $V_i^P$ and/or position in each feeding unit, for at least one time step of the solidification process, and providing the at least one simulation result to a user.

11. The method according to claim 10, further comprising:

determining a starting time $t_0$ for a simulation of the solidification process;

determining a sequence of simulation results for the solution domain at consecutive time steps after the starting time $t_0$ at least until a time step of complete solidification, in an iterative manner, wherein the time step of complete solidification is determined based on the calculated fraction liquid distribution $F_l$ as the time step wherein fraction liquid $f_l=0$ for the whole solution domain; and providing the sequence of simulation results to a user via a user interface device.

12. The method according to claim 10, wherein the at least one simulation result is mapped onto the 3D computer model and then provided to a user via a user interface device.

13. The method according to claim 1, further comprising at least one of determining an optimized location of a feeder and/or a feed aid;

modifying the boundary conditions to be used in the metal casting process; or modifying a design of the cast metal object itself;

based at least in part on the calculated change in quantity and/or position of porosity in at least one of the feeding units for at least one time step of the solidification process, in order to minimize or eliminate the porosity, or to change the position of the porosity.

14. The method according to claim 1, further comprising receiving a user input comprising at least one of a modified characteristic of at least one of the 3D computer model, a modified location of at least one feeder or feed aid, or modified boundary conditions;

determining at least one updated simulation result for the metal casting process based on a re-calculated change in quantity and/or position of porosity in each feeding unit based on the modified characteristic; and providing the at least one updated simulation result to a user.

15. A system comprising:

a user interface device;

a computer-readable storage device including a computer program; and one or more processors operable to execute the computer program, interact with the user interface device, and implement the method of claim 1.

16. A computer program product, comprising program instructions encoded on a non-transitory computer-readable storage device, configured to cause an apparatus, when run on one or more processors of the apparatus, to perform the method of claim 1.

* * * * *